United States Patent
Guo et al.

(10) Patent No.: US 12,210,184 B2
(45) Date of Patent: Jan. 28, 2025

(54) BACK PLATE, FRAME STRUCTURE, BACKLIGHT MODULE AND DISPLAY APPARATUS

(71) Applicants: Beijing BOE Display Technology Co., Ltd., Beijing (CN); BOE TECHNOLOGY GROUP CO., LTD., Beijing (CN)

(72) Inventors: Junjie Guo, Beijing (CN); Jiantao Liu, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/911,719

(22) PCT Filed: Oct. 29, 2021

(86) PCT No.: PCT/CN2021/127236
§ 371 (c)(1),
(2) Date: Sep. 15, 2022

(87) PCT Pub. No.: WO2022/193670
PCT Pub. Date: Sep. 22, 2022

(65) Prior Publication Data
US 2024/0219623 A1    Jul. 4, 2024

(30) Foreign Application Priority Data
Mar. 16, 2021   (CN) .................. 202110280498.1

(51) Int. Cl.
*F21V 8/00* (2006.01)

(52) U.S. Cl.
CPC .......... *G02B 6/0088* (2013.01); *G02B 6/0051* (2013.01)

(58) Field of Classification Search
CPC ........................... G02B 6/0088; G02B 6/0051
See application file for complete search history.

(56) References Cited

U.S. PATENT DOCUMENTS

2015/0036381 A1    2/2015   Zhou

FOREIGN PATENT DOCUMENTS

| CN | 102566101 A | 7/2012 |
| CN | 102620203 A | 8/2012 |
| CN | 102679275 A | 9/2012 |
| CN | 102679285 A | 9/2012 |
| CN | 202886772 U | 4/2013 |
| CN | 203786693 U | 8/2014 |
| CN | 207602177 U | 7/2018 |

(Continued)

OTHER PUBLICATIONS

China Patent Office, First Office Action, Nov. 22, 2024, corresponding CN application No. 202110280498.1.

*Primary Examiner* — Joseph L Williams
(74) *Attorney, Agent, or Firm* — HOUTTEMAN LAW LLC

(57) ABSTRACT

A back plate for being assembled with a middle frame to form a frame structure, wherein the middle frame includes a bearing structure having a bearing surface for bearing a display panel, the back plate includes a bottom plate and a side wall formed by bending an edge of the bottom plate, and the side wall is used for being assembled with the middle frame, wherein a first supporting structure is formed on the bottom plate, and the first supporting structure is used for supporting the bearing structure.

14 Claims, 4 Drawing Sheets

(56) References Cited

FOREIGN PATENT DOCUMENTS

| CN | 209373961 U | 9/2019 |
|---|---|---|
| CN | 209746305 U | 12/2019 |
| CN | 210896332 U | 6/2020 |
| CN | 112946956 A | 6/2021 |
| CN | 214795498 U | 11/2021 |

BACK PLATE, FRAME STRUCTURE, BACKLIGHT MODULE AND DISPLAY APPARATUS

TECHNICAL FIELD

The present disclosure relates to the technical field of display, and particularly to a back plate, a frame structure, a backlight module and a display apparatus.

BACKGROUND

With the development of the television industry, full-screen has gradually become a trend. An ultra-high screen ratio can present a wider field of view within a specific screen size, bringing a user a shocking visual experience.

An LCD panel itself does not emit light, and thus requires a backlight module to provide light to the LCD panel. At present, the main components of the backlight module include a frame structure, and an optical module and a light source which are fixed in the frame structure. The frame structure includes a back plate and a middle frame, and the middle frame includes a bearing structure for bearing the display panel.

SUMMARY

The present disclosure provides a back plate, a frame structure, a backlight module and a display apparatus.

In a first aspect, the present disclosure provides a back plate for being assembled with a middle frame to form a frame structure, wherein the middle frame includes a bearing structure having a bearing surface for bearing a display panel, the back plate includes a bottom plate and a side wall formed by bending an edge of the bottom plate, and the side wall is used for being assembled with the middle frame, wherein a first supporting structure is formed on the bottom plate, and the first supporting structure is used for supporting the bearing structure.

In some embodiments, the first supporting structure is further configured to clamp and fix an optical module configured for the display panel, together with a side of the supporting structure away from the bearing surface.

In some embodiments, the first supporting structure is formed by bending a partial area of the back plate, and the first supporting structure is also used as a reinforcing rib.

In some embodiments, a cross-sectional shape of the first supporting structure in a cross-section perpendicular to the bottom plate is in a shape of " 几 ".

In some embodiments, a surface of the first supporting structure away from the back plate is flat and has a width of 2 mm or less.

In some embodiments, a side of the bearing structure away from the bearing surface is provided with a second supporting structure; and an accommodating groove is defined between the first supporting structure and the side wall, and the accommodating groove is used for accommodating and supporting the second supporting structure.

In a second aspect, an embodiment of the present disclosure provides a frame structure, including the back plate provided in the first aspect and a middle frame assembled with the back plate.

In some embodiments, the middle frame has a bearing structure, which has a bearing surface with a width w2 greater than or equal to 0.5 mm and less than or equal to 6 mm.

In some embodiments, the middle frame further includes a body structure, the bearing structure is on the body structure, the bearing structure and the body structure have a one-piece structure; and the body structure is assembled and fixed with the side wall of the back plate.

In a third aspect, an embodiment of the present disclosure provides a backlight module, including the frame structure as provided in the second aspect above.

In some embodiments, the backlight module further includes an optical module; and the optical module is between the first supporting structure and the bearing structure, and the first supporting structure and a side of the bearing structure away from the bearing surface are matched to clamp and fix the optical module.

In a fourth aspect, an embodiment of the present disclosure further provides a display apparatus, including the backlight module as provided in the third aspect above, and a display panel fixed on the bearing surface.

DETAIL DESCRIPTION OF EMBODIMENTS

In order to make one of ordinary skill in the art better understand the technical solution of the present disclosure, the following describes a back plate, a frame structure, a backlight module and a display apparatus provided in the present disclosure in detail with reference to the accompanying drawings.

Figure 1:
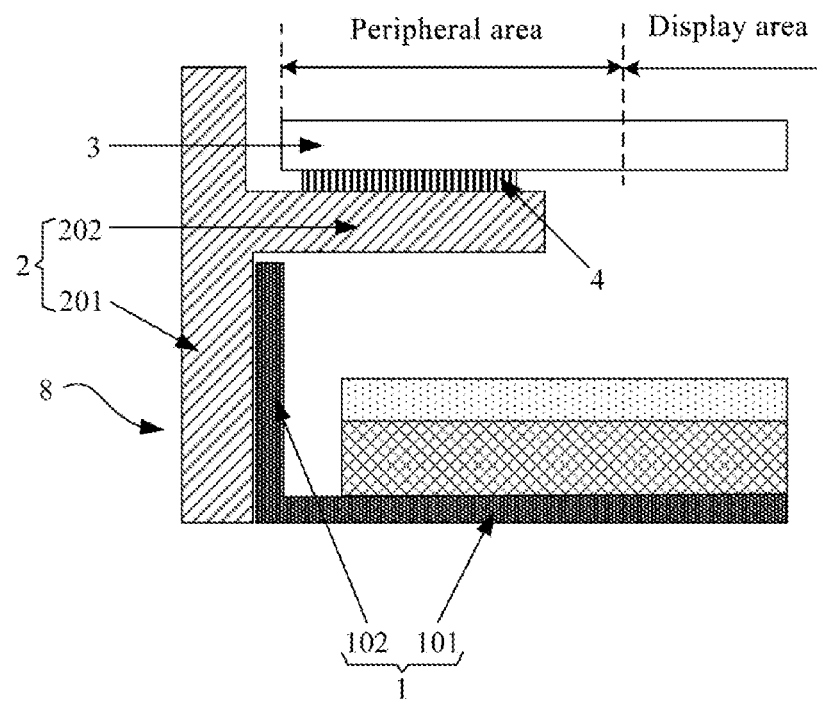
FIG. 1 is a schematic cross-sectional view of a display apparatus involved in the related art.

FIG. 1 is a schematic cross-sectional view of a display apparatus involved in the related art. As shown in FIG. 1, the display apparatus includes a frame structure 8 and a display panel 3. The frame structure 8 includes a back plate 1 and a middle frame 2. The back plate 1 includes a bottom plate 101 (for carrying a light source, generally arranged in a plane shape) and a side wall 102, and the middle frame 2 includes a body structure 201 and a bearing structure 202. The bearing structure 202 is configured to bear and fix the display panel 3. Specifically, the display panel 3 includes a display area and a peripheral area surrounding the display area (the peripheral area does not display images), and the peripheral area of the display panel 3 is fixed on a bearing surface through a double-sided tape 4.

With the development of the full-screen technology, a width of the peripheral area of the display panel 3 becomes narrower and narrower. If a width of the bearing structure 202 is kept unchanged, after the display panel 3 and the bearing surface of the bearing structure 202 are fixed relative to each other, the bearing structure 202 and the double-sided tape 4 may intrude into the display area of the display panel 3, which affects the display effect. If the width of the bearing structure 202 is reduced to prevent the bearing structure 202 and the double-sided tape 4 from intruding into the display area of the display panel 3, stress deformation of the bearing structure 202 (for example, the bearing structure 202 is deformed downward when the display panel 3 presses the bearing structure 202 downward) is prone to occur, which causes the double-sided tape 4 between the bearing surface and the display panel 3 to be invalid, and further causes the display panel 3 to be separated from the bearing structure 2, i.e., a bearing stability of the bearing structure 202 is low.

In order to solve at least one technical problem in the related art, the present disclosure provides a corresponding technical solution, which will be described in detail with reference to specific embodiments.

Figure 2:
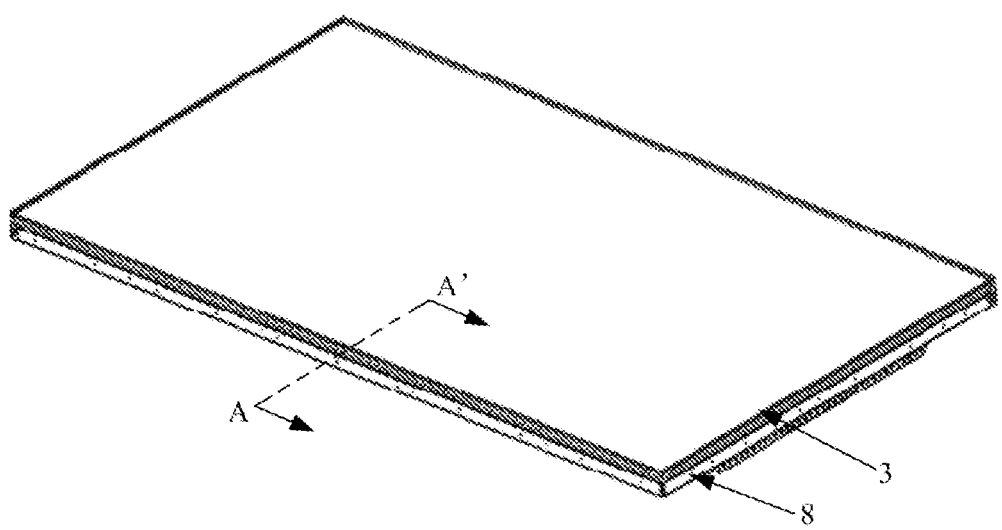
FIG. 2 is a schematic diagram of a structure of a display apparatus involved in the present disclosure.
Figure 3:
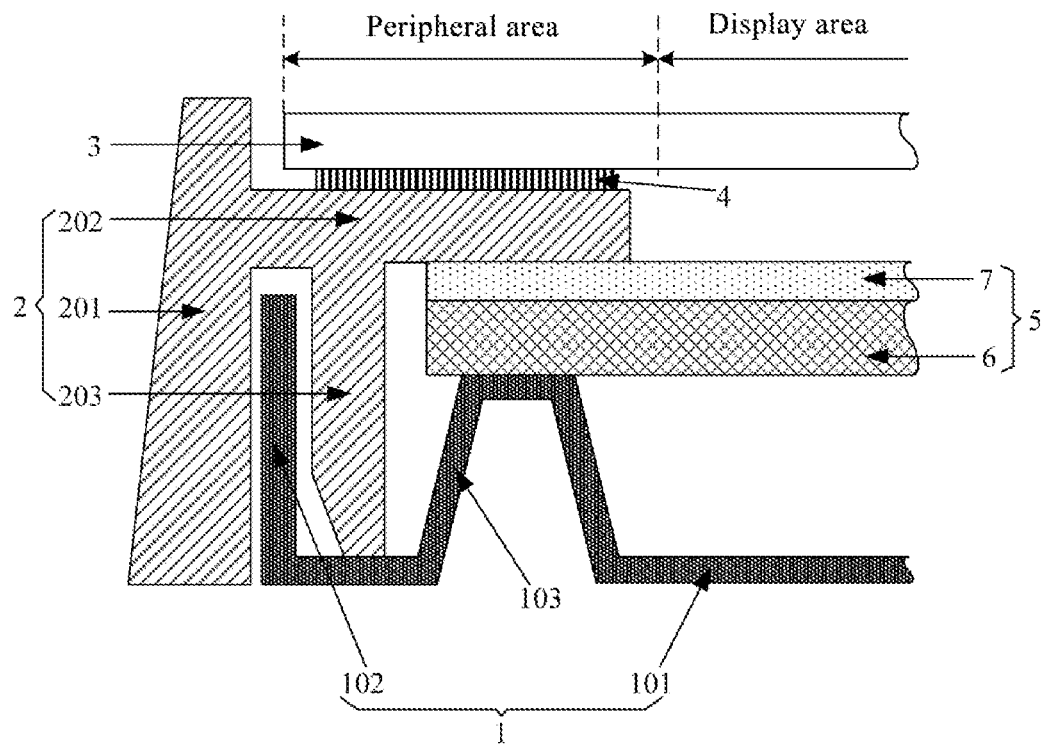
FIG. 3 is a schematic cross-sectional view taken along a line A-A' in FIG. 2.

FIG. 2 is a schematic diagram of a structure of a display apparatus involved in the present disclosure, and FIG. 3 is a schematic cross-sectional view taken along a line A-A' in FIG. 2. As shown in FIGS. 2 and 3, the display apparatus includes a backlight module and a display panel 3. The backlight module includes a frame structure 8, an optical module 5 and a light source (not shown). The frame structure 8 includes a back plate 1 and a middle frame 2, which are assembled and fixed together. The middle frame 2 includes a body structure 201 and a bearing structure 202, and the display panel 3 is fixed on a bearing surface of the bearing structure 202. The optical module includes a light guide plate 6 and an optical film 7 (the optical module may further include a diffuser and the like), and is fixed in the frame structure 8.

In some embodiments, a side surface of the light guide plate 6 may be a light incident surface. In this case, the light source is an edge-lit light source, and a reflective film may be disposed on a lower surface of the light guide plate 6 to increase a light output amount from an upper surface of the light guide plate 6. In other embodiments, the lower surface of the light guide plate 6 is a light incident surface. In this case, the light source is a direct-lit light source, and a reflective film may be disposed on the side surface of the light guide plate 6 to increase the light output amount from the upper surface of the light guide plate 6. Both cases fall within the protection scope of the present disclosure.

Figure 4:
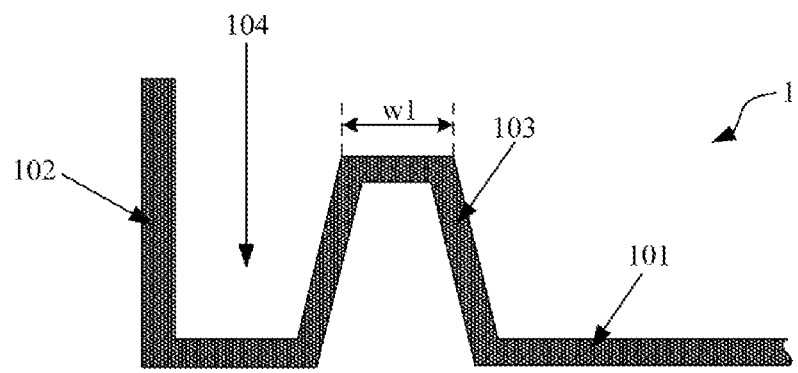
FIG. 4 is a schematic cross-sectional view of a back plate provided in an embodiment of the present disclosure.

FIG. 4 is a schematic cross-sectional view of a back plate provided in an embodiment of the disclosure. As shown in FIGS. 2 to 4, the present disclosure provides a back plate 1, which is used for being assembled with a middle frame 2 to form a frame structure 8. The middle frame 2 includes a bearing structure 202 having a bearing surface, and the bearing surface is used for bearing a display panel 3. The back plate 1 includes a bottom plate 101 and a side wall 102 formed by bending an edge of the bottom plate 101. The side wall 102 is used for being assembled with the middle frame 2. A first supporting structure 103 is formed on the bottom plate 101, and the first supporting structure 103 is used for supporting the bearing structure 202.

In the embodiment of the present disclosure, through forming the first supporting structure 103 on the bottom plate 101, the first supporting structure 103 may play a role in supporting the bearing structure 202 in the middle frame 2 after the back plate 1 and middle frame 2 are assembled together, which can effectively prevent stress deformation of the bearing structure 202 from occurring, thereby improving the overall bearing stability of bearing structure 202, and ensuring bonding firmness between the display panel 3 and the bearing structure 202.

It should be noted that, in the embodiment of the present disclosure, the first supporting structure 103 supporting the bearing structure 202 is not limited to the case that the first supporting structure 103 is in direct contact with the bearing structure 202 to support the bearing structure 202, and the first supporting structure 103 may alternatively support the bearing structure 202 through another structure in contact with the bearing structure 202. The bearing structure 202 will be described later with reference to specific examples.

In some embodiments, the first supporting structure 103 is formed by bending a partial area of the bottom plate 101, and the first supporting structure 103 is also used as a reinforcing rib to improve the overall strength and rigidity of the back plate 1, so as to effectively prevent stress deformation of the back plate 1 from occurring.

Further, a cross-sectional shape of the first supporting structure 103 in a cross-section perpendicular to the bottom plate 101 is in a shape of a Chinese character "ji" ("几", which means "several" in English). The reinforcing rib structure in the shape of "几" can improve the overall strength and rigidity of the back plate 1 on one hand, and on the other hand, a top (a surface on a side away from the bottom plate 101) of the reinforcing rib structure is flat, which is beneficial to providing a stable support. In some embodiments, a surface of the first supporting structure 103 on a side away from the bottom plate 101 is flat and has a predetermined width w1. If the width w1 is too great, the overall strength and rigidity of the back plate 1 will be reduced. In some embodiments, the width w1 satisfies $0 < w1 \leq 2$ mm.

In some embodiments, a second supporting structure 203 is disposed on a side of the bearing structure 202 away from the bearing surface. An accommodating groove 104 is defined between the first supporting structure 103 and the side wall 102, and the accommodating groove 104 is used for accommodating and supporting the second supporting structure 203. Details thereof will be described later with reference to the accompanying drawings.

In some embodiments, the first supporting structure 103 is further configured to clamp and fix the optical module 5 configured for the display panel 3, together with a side of the bearing structure 202 away from the bearing surface. In this case, the first supporting structure 103 supports the bearing structure 202 through the optical module 5. Details thereof will be described later with reference to the accompanying drawings.

The back plate 1 provided in the embodiment of the present disclosure may be a one-piece structure, and may be made of a metal material (e.g., aluminum). Specifically, the back plate 1 may be manufactured through a metal stamping process.

Figure 5:
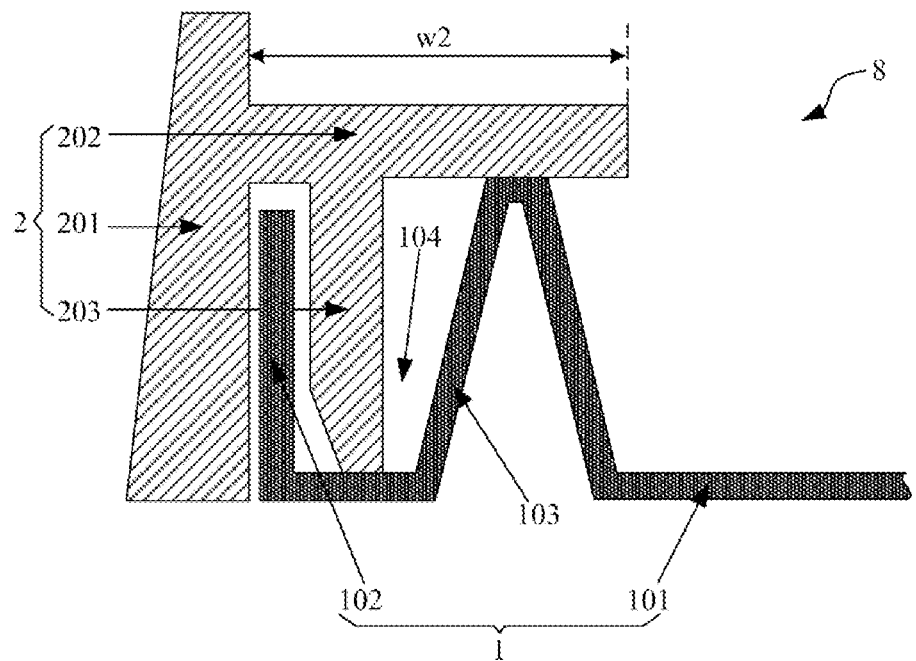
FIG. 5 is a schematic cross-sectional view of a frame structure provided in an embodiment of the present disclosure.

FIG. 5 is a schematic cross-sectional view of a frame structure provided in an embodiment of the present disclosure. As shown in FIG. 5, an embodiment of the present disclosure further provides a frame structure 8, which includes a back plate 1 and a middle frame 2. The back plate 1 adopts the back plate 1 provided in the above embodiment, and specific contents may be referred to those in the foregoing embodiment, which are not repeated herein.

The middle frame 2 includes a body structure 201 and a bearing structure 202 on the body structure 201. The body structure 201 is used for being assembled and fixed with the side wall 102 of the back plate 1, for example, by a snap-fit fixing, a screw fixing, etc., and the technical solution of the present disclosure does not limit a specific assembling manner.

In some embodiments, a width w2 of the bearing surface of the bearing structure 202 satisfies 0.5 mm≤w2≤6 mm.

The width of the bearing surface of the bearing structure 202 may be designed according to the width of the peripheral area of the display panel 3, and generally, the width of the bearing surface is slightly smaller than the width of the peripheral area of the display panel 3. Considering that the width of the peripheral area of the conventional display panel 3 is in a range of 0.6 mm to 6 mm, in some embodiments, the width w2 of the bearing surface of the bearing structure 202 satisfies 0.5 mm≤w2≤6 mm.

In some embodiments, the bearing structure 202 and the body structure 201 have a one-piece structure. Alternatively, the whole middle frame 2 is an integrally molded structure, and a material of the middle frame 2 includes plastic. The middle frame 2 may be manufactured through an injection molding process.

In some embodiments, in the middle frame 2, the second supporting structure 203 is disposed on a side of the bearing structure 202 away from the bearing surface. In the back plate 1, the accommodating groove 104 is defined between the first supporting structure 103 and the side wall 102, and the accommodating groove 104 is used for accommodating the second supporting structure 203. Meanwhile, a height of the second supporting structure 203 is reasonably set so that a bottom of the second supporting structure 203 is in contact with a bottom (the bottom plate 101) of the accommodating groove 104, i.e., the bottom of the accommodating groove 104 can support the second supporting structure 203. In this case, the second supporting structure 203 can also support the bearing structure 202, so that the overall bearing stability of the bearing structure 202 can be further improved.

In the case shown in FIG. 5, the first supporting structure 103 is in direct contact with the bearing structure 202 to support the bearing structure 202.

Figure 6:
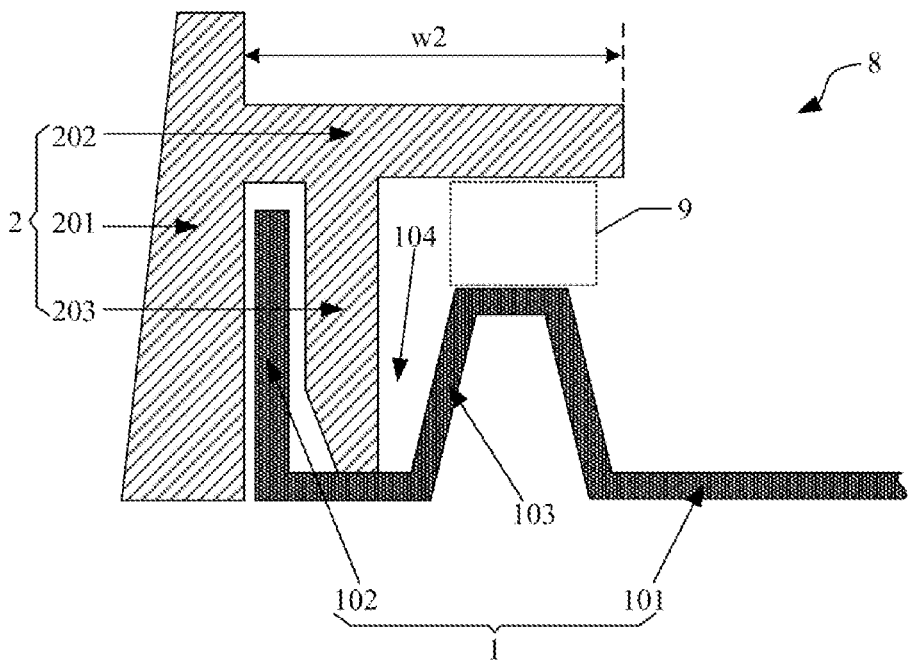
FIG. 6 is a schematic cross-sectional view of a frame structure provided in an embodiment of the present disclosure.

FIG. 6 is a schematic cross-sectional view of a frame structure provided in an embodiment of the present disclosure. As shown in FIG. 6, unlike the case shown in FIG. 5, in the case shown in FIG. 6, a certain accommodating space 9 exists between the top of the first supporting structure 103 and the bearing structure 202, and the accommodating space 9 is used for clamping and fixing the optical module 5 between the first supporting structure 103 and the bearing structure 202. In this case, the first supporting structure 103 supports the bearing structure 202 through the optical module 5.

Figure 7:
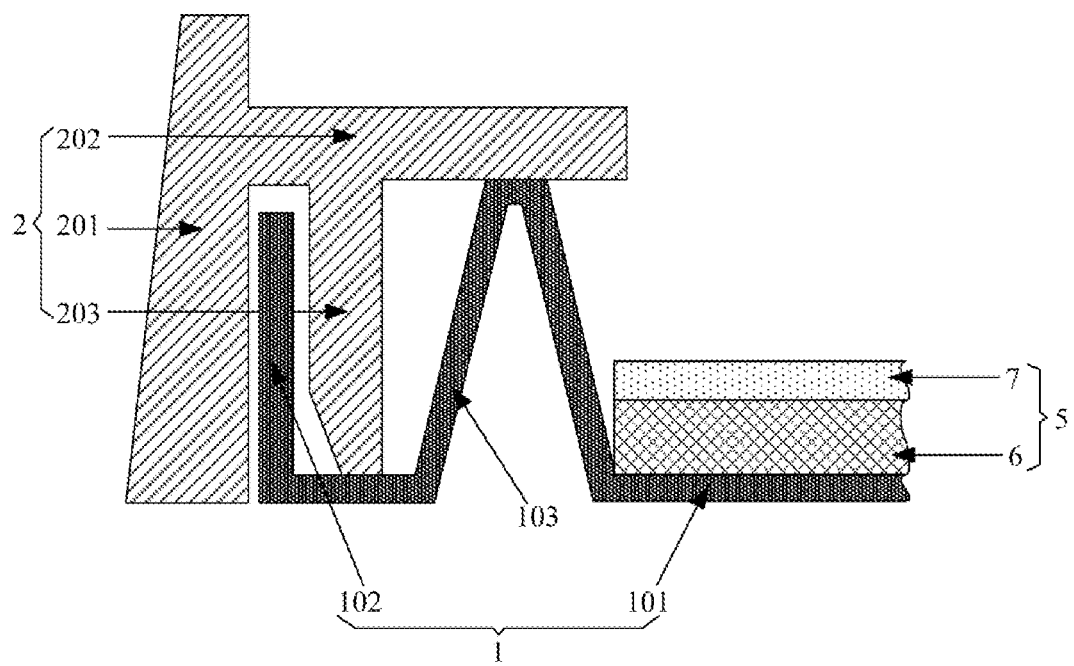
FIG. 7 is a schematic cross-sectional view of a backlight module provided in an embodiment of the disclosure.
Figure 8:
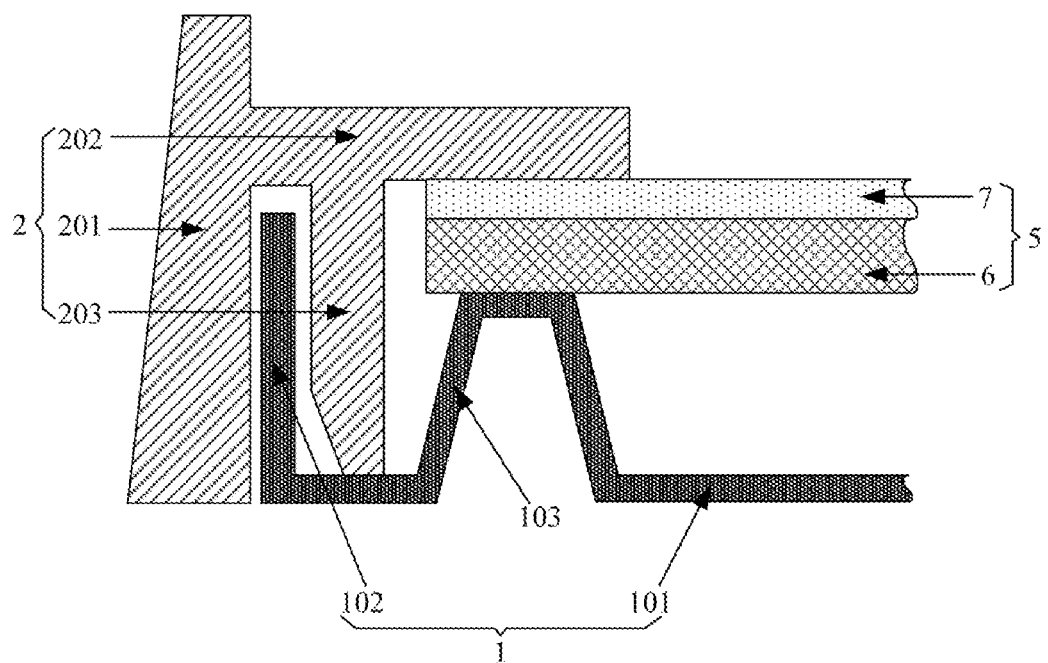
FIG. 8 is a schematic cross-sectional view of another backlight module provided in an embodiment of the disclosure.

FIG. 7 is a schematic cross-sectional view of a backlight module provided in an embodiment of the disclosure, and FIG. 8 is a schematic cross-sectional view of another backlight module provided in an embodiment of the disclosure. As shown in FIGS. 7 and 8, an embodiment of the present disclosure further provides a backlight module, which includes a frame structure 8. The frame structure 8 adopts the frame structure 8 provided in the above embodiment, and specific description of the frame structure 8 may be referred to those in the foregoing embodiment, which are not repeated herein.

In some embodiments, the backlight module further includes an optical module 5, the optical module 5 at least includes a light guide plate 6 and an optical film 7 (which may further include a diffuser, etc.), and the optical module is fixed in the frame structure 8.

Referring to FIG. 7, in some embodiments, the first supporting structure 103 is in direct contact with the bearing structure 202, and the optical module 5 may be fixed on the back plate 1. Referring to FIG. 8, an accommodating space exists between the top of the first supporting structure 103 and the bearing structure 202, the optical module 5 is located between the first supporting structure 103 and the bearing structure 202, and the first supporting structure 103 and a side of the bearing structure 202 away from the bearing surface are matched to clamp and fix the optical module 5.

It should be noted that the backlight module in the embodiments of the present disclosure further includes a light source, and the light source may be a direct-lit light source or an edge-lit light source.

Based on the same inventive concept, an embodiment of the present disclosure further provides a display apparatus. As shown in FIG. 3, the display apparatus includes a backlight module and a display panel 3. The backlight module adopts the backlight module provided in the above embodiment, and specific description of the backlight module may be referred to those in the foregoing embodiment, which are not repeated herein. The display panel 3 may be fixed on the bearing surface by an adhesive structure (e.g., a double-sided tape 4 or a fixing glue).

It should be noted that the backlight module in the display apparatus shown in FIG. 3 adopting the case shown in FIG. 8 is only used for exemplary purposes, and does not limit the technical solution of the present disclosure. In some embodiments, the backlight module in the display apparatus shown in FIG. 3 may be replaced with the case shown in FIG. 7, and this technical solution also falls within the protection scope of the present disclosure.

The display apparatus in the embodiments of the present disclosure may be any product or component with a display function, such as a liquid crystal display, an electronic paper, a mobile phone, a tablet computer, a television, a notebook computer, a digital photo frame, a navigator, or the like.

In the technical solution of the present disclosure, through forming the first supporting structure on the bottom plate, the first supporting structure may play a role in supporting the bearing structure in the middle frame after the back plate and the middle frame are assembled together, which can effectively prevent stress deformation of the bearing structure from occurring, thereby improving the overall bearing stability of bearing structure, and ensuring the bonding firmness between the display panel and the bearing structure.

It will be understood that the above embodiments are merely exemplary embodiments adopted to illustrate the principles of the present disclosure, and the present disclosure is not limited thereto. It will be apparent to one of ordinary skill in the art that various changes and modifications can be made without departing from the spirit and scope of the present disclosure, and these changes and modifications also fall within the protection scope of the present disclosure.

What is claimed is:

1. A back plate, for being assembled with a middle frame to form a frame structure, wherein the middle frame comprises a bearing structure having a bearing surface for bearing a display panel, the back plate comprises a bottom plate and a side wall formed by bending an edge of the bottom plate, and the side wall is used for being assembled with the middle frame, wherein a first supporting structure is formed on the bottom plate, and the first supporting structure is used for supporting the bearing structure, wherein the first supporting structure is formed by bending a partial area of the back plate, and the first supporting structure is also used as a reinforcing rib, wherein a cross-sectional shape of the first supporting structure in a cross-section perpendicular to the bottom plate is in a shape of "⊥", and a height of the first supporting structure with respect to the bottom plate is greater than a height of the side wall with respect to the bottom plate.

2. The back plate according to claim 1, wherein a surface of the first supporting structure away from the back plate is flat and has a width of 2 mm or less.

3. The back plate according to claim 1, wherein a side of the bearing structure away from the bearing surface is provided with a second supporting structure; and an accommodating groove is defined between the first supporting structure and the side wall, and the accommodating groove is used for accommodating and supporting the second supporting structure.

4. A frame structure, comprising the back plate according to claim 1, and a middle frame assembled with the back plate.

5. The frame structure according to claim 4, wherein the middle frame has a bearing structure, which has a bearing surface with a width greater than or equal to 0.5 mm and less than or equal to 6 mm.

6. The frame structure according to claim 5, wherein the middle frame further comprises a body structure, the bearing structure is on the body structure, the bearing structure and the body structure have a one-piece structure; and the body structure is assembled and fixed with the side wall of the back plate.

7. The frame structure according to claim 4, wherein the middle frame further comprises a body structure, the bearing structure is on the body structure, the bearing structure and the body structure have a one-piece structure; and the body structure is assembled and fixed with the side wall of the back plate.

8. A backlight module, comprising the frame structure according to claim 4.

9. The backlight module according to claim 8, further comprising an optical module, wherein the optical module is between the first supporting structure and the bearing structure, and the first supporting structure and a side of the bearing structure away from the bearing surface are matched to clamp and fix the optical module.

10. A display apparatus, comprising the backlight module according to claim 8, and a display panel fixed on the bearing surface.

11. The frame structure according to claim 10, wherein a surface of the first supporting structure away from the back plate is flat and has a width of 2 mm or less.

12. The backlight module according to claim 8, wherein the middle frame has a bearing structure, which has a bearing surface with a width greater than or equal to 0.5 mm and less than or equal to 6 mm.

13. The backlight module according to claim 8, wherein the middle frame further comprises a body structure, the bearing structure is on the body structure, the bearing structure and the body structure have a one-piece structure; and the body structure is assembled and fixed with the side wall of the back plate.

14. The frame structure according to claim 4, wherein a side of the bearing structure away from the bearing surface is provided with a second supporting structure; and an accommodating groove is defined between the first supporting structure and the side wall, and the accommodating groove is used for accommodating and supporting the second supporting structure.

* * * * *